July 21, 1953     H. H. NORMAN     2,646,108

SPRING

Filed April 30, 1951

HARRY H. NORMAN,
INVENTOR.

BY Hazard & Miller
ATTORNEYS

Patented July 21, 1953

2,646,108

UNITED STATES PATENT OFFICE 2,646,108

SPRING

Harry H. Norman, Los Angeles, Calif., assignor to Zig Zag Spring Company, Los Angeles, Calif., a partnership Application April 30, 1951, Serial No. 223,738

9 Claims. (Cl. 155—179)

This invention relates to improvements in springs and particularly to that type of spring formed of laterally corrugated spring wire. Heretofore springs have been produced by laterally corrugating spring wire and longitudinally arching the strip so that the strip in its normal or unstressed condition would be approximately circular in form. In mounting such springs on furniture frames or automobile seat frames the spring is usually opened and anchored at or near its ends on the frame so that the spring in applied position would be in a prestressed condition. The flexibility of resiliency of such springs is largely derived by the torsion or twisting of the connecting bars that connect the semicircular loops at the sides of the strip. Near the anchoring points for the spring which are usually but not always at the ends of the strip the number of connecting bars susceptible of being twisted continually decreases so that springs of this general type are usually regarded as stiffer near their anchoring points than at localities remote therefrom. Heretofore in order to equalize the resiliency of the spring it has been customary to construct the spring from that gauge of wire that will give the desired resiliency near the anchoring points and at the center of the spring or at locations remote from the anchoring points suitable stiffeners have been applied to compensate for the greater yieldability of the spring remote from the anchoring points.

An object of the present invention is to provide an improved spring consisting of a span of longitudinally arched laterally corrugated spring wire the convolutions of which are individually of uniform size and shape. However, near the ends of the spring or at the points where the spring is anchored to the frame the adjacent convolutions are bent in such a manner as to have an angular relationship to each other so that in appearance the spring appears to have been corrugated in a vertical direction. This angular relationship between adjacent corrugations progressively increases toward the anchoring points with the result that there are more twistable connecting bars per unit of length of the span near the anchoring points than there are near the center of the spring. By thus providing additional connecting bars near the anchoring points there are more portions of the spring that are subject to twist near the anchoring points and consequently the spring has a yieldability near the anchoring points comparable with the yieldability at the center thereof even though the gauge of the wire is uniform throughout and even though the size and shape of individual convolutions is uniform throughout.

With the foregoing and other objects in view, which will be made manifest in the following detailed description and specifically pointed out in the appended claims, reference is had to the accompanying drawings for an illustrative embodiment of the invention, wherein.

Figure 1:
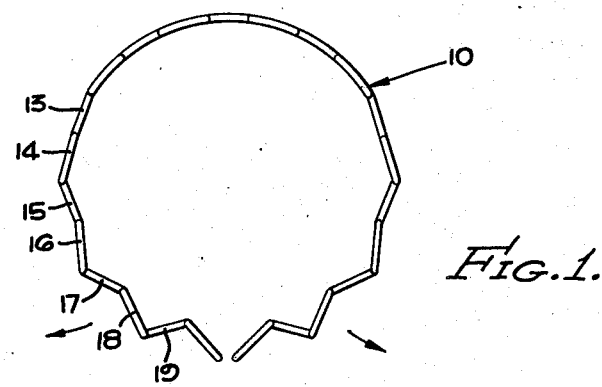
Figure 1 is a view of one form of improved spring, the spring being shown in its normal or unstressed condition.
Figure 2:
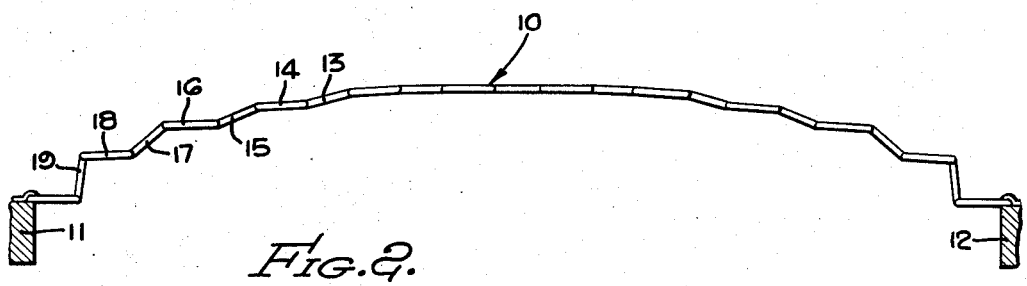
Fig. 2 is a view of the spring shown in Fig. 1 illustrating the spring in its mounted or stressed condition.

Referring to the accompanying drawings wherein similar reference characters designate similar parts throughout, the spring illustrated in Fig. 1 consists of a laterally corrugated strip of spring wire, the spring wire being of uniform gauge from end to end and being uniformly corrugated in a lateral direction providing semicircular loops at the sides of the strip connected by connecting bars. Such a strip may be formed in any suitable manner and a number of machines have been developed for producing such strips. After the strip has been corrugated it is then longitudinally arched so that in its normal or unstressed condition it is approximately circular in side elevation. In applying such a spring, indicated at 10, to a frame, parts of which are indicated at 11 and 12, the spring is opened or stretched out to form a slightly arched span, the ends of which are anchored in any suitable manner on the frame. The present improvement consists in bending the end convolutions of the spring so as to cause them to assume an angular relationship to each other. Thus, as depicted in Fig. 2, the center convolutions may be regarded as being all arranged in approximately the same plane but as the ends of the span or the anchoring points are approached the connecting bars of adjacent convolutions are twisted and given a permanent set so that the adjacent convolutions will have an angular relationship to each other. Preferably this angular relationship progressively increases as the end of the span is approached. Thus, as shown in Fig. 2, the angular relationship between adjoining convolutions 13 and 14 is relatively slight but the angular relationship between convolutions 14 and the adjoining convolution 15 increases. This angular relationship increases with the convolutions 16, 17, 18 and 19. Thus, although the spacing of the connecting bars of the convolutions is uniform throughout the length of the wire, near the end of the span there are more connecting bars per linear length of the span than there are near the center of the span. Consequently as there are more connecting bars subject to twisting when the spring is loaded, the spring may be regarded as being more resilient near the ends of the span than near the center to compensate for the deadening or stiffening effect of the anchoring points.

The improved spring can be readily produced on any conventional or preferred machine that will produce uniform laterally corrugated wire and which will longitudinally arch the corrugated wire. Thereafter the end loops of adjoining corrugations may be turned relatively to each other about the axes of the connecting bars and given the desired set so that adjoining convolutions will have an angular relationship to each other which progressively increases towards the ends of the span. After the spring has been thus formed it is heat treated or normalized in any conventional or preferred manner.

Figure 3:
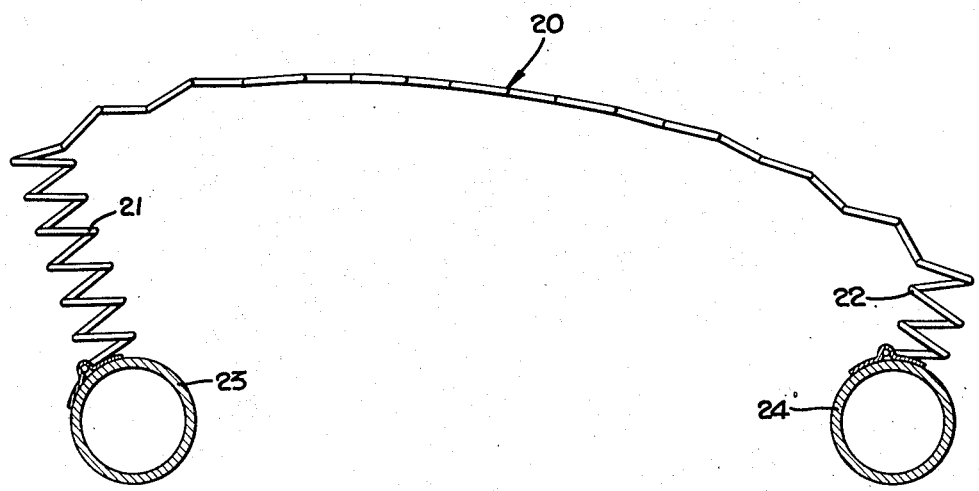
Fig. 3 is a view similar to Fig. 2 but illustrating an alternative form of construction.

In Fig. 3 an alternative form of construction is disclosed wherein the span 20 is constructed from end to end in the same manner as that disclosed in Figs. 1 and 2 but in addition the endmost convolutions are reversely bent upon themselves to form ovate coils 21 and 22, the convolutions of which are open or spaced from each other and the axes of which are approximately normal to the ends of the span. The lower ends of these coils may be anchored to the frame elements 23 and 24 of the seat frame.

From the above described construction it will be appreciated that the improved spring can be made of spring wire of uniform gauge and that it may be laterally corrugated by machine which will produce uniform corrugations therein. After having been longitudinally arched by the expedient of twisting the end convolutions so as to cause adjacent convolutions to have an angular relationship to each other that preferably progressively increases toward the anchoring points the desired relative stiffness between the ends of the span and the center thereof can be secured. The use of stiffeners near the center of the span can thus be entirely avoided and the spring can be formed of a gauge of wire that will have the desired resiliency near the center of the span without resorting to stiffeners.

Various changes may be made in the details of the construction without departing from the spirit and scope of the invention as defined by the appended claims.

I claim:

1. A spring comprising a span of laterally corrugated spring wire longitudinally arched, the convolutions adjacent the ends of which inwardly of the supported ends of the span are vertically corrugated with a plurality of up and down corrugations.

2. A spring comprising a span of laterally corrugated spring wire longitudinally arched, convolutions of which inwardly of the supported ends of the span as they approach the ends of the span are vertically corrugated with a plurality of up and down progressively deeper corrugations.

3. A spring comprising a span of laterally corrugated spring wire longitudinally arched, a plurality of adjacent convolutions of which inwardly of the supported ends of the span as they approach the ends of the span have an up and down angular relationship with respect to each other.

4. A spring comprising a span of laterally corrugated spring wire longitudinally arched, a plurality of adjacent convolutions of which inwardly of the supported ends of the span as they approach the ends of the span have an up and down angular relationship with respect to each other which progressively increases towards the ends of the span.

5. A spring comprising a span of laterally corrugated spring wire the convolutions of which are in the form of semi-circular loops connected by connecting bars which are equally spaced from each other, a plurality of the adjacent convolutions inwardly of the supported ends of the span having a greater angular relationship to each other than others so that in the localities of these convolutions there will be more connecting bars per linear length of span than elsewhere.

6. A spring comprising a span of laterally corrugated spring wire the convolutions of which are in the form of semi-circular loops connected by connecting bars which are spaced from each other equally, a plurality of the adjacent convolutions near the ends of the span inwardly thereof having a greater angular relationship to each other than those near the center of the span so that in the localities of these convolutions there will be more connecting bars per linear length of span than elsewhere.

7. A spring comprising a span of laterally corrugated spring wire the convolutions of which are in the form of semi-circular loops connected by connecting bars which are spaced from each other equally, a plurality of the adjacent convolutions near the ends of the span having a greater angular relationship to each other than those near the center of the span so that in the localities of these convolutions there will be more connecting bars per linear length of span than elsewhere and endmost convolutions being reversely bent upon themselves to provide ovate coils integral with the ends of the span.

8. A spring comprising a span of laterally corrugated spring wire the convolutions of which are in the form of semi-circular loops connected by connecting bars which are spaced from each other equally, a plurality of the adjacent convolutions near the ends of the span having a greater angular relationship to each other than those near the center of the span so that in the localities of these convolutions there will be more connecting bars per linear length of span than elsewhere and endmost convolutions being reversely bent upon themselves to provide ovate coils integral with the ends of the span the axes of which are approximately normal to the ends of the span.

9. A spring comprising a span of laterally corrugated spring wire longitudinally arched, said spring being of unequal resiliency per unit of length across the span, the more resilient portions between the ends of the span being formed by having lateral corrugations forming these portions also vertically corrugated in a direction considered longitudinally of the span.

HARRY H. NORMAN.

References Cited in the file of this patent

UNITED STATES PATENTS

| Number | Name | Date |
|---|---|---|
| 2,047,411 | Freund | July 14, 1936 |
| 2,169,705 | Mouw | Aug. 15, 1939 |
| 2,246,893 | Nordmark | June 24, 1941 |
| 2,257,367 | Bernstein | Sept. 30, 1941 |
| 2,257,633 | Bank | Sept. 30, 1941 |
| 2,308,772 | Neely | Jan. 19, 1943 |
| 2,568,829 | Scott et al. | Sept. 25, 1951 |